United States Patent
Kim et al.

(10) Patent No.: US 11,721,319 B2
(45) Date of Patent: Aug. 8, 2023

(54) ARTIFICIAL INTELLIGENCE DEVICE AND METHOD FOR GENERATING SPEECH HAVING A DIFFERENT SPEECH STYLE

(71) Applicant: LG ELECTRONICS INC., Seoul (KR)

(72) Inventors: Minook Kim, Seoul (KR); Yongchul Park, Seoul (KR); Sungmin Han, Seoul (KR); Siyoung Yang, Seoul (KR); Sangki Kim, Seoul (KR); Juyeong Jang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 226 days.

(21) Appl. No.: 16/803,941

(22) Filed: Feb. 27, 2020

(65) Prior Publication Data
US 2021/0174782 A1    Jun. 10, 2021

(30) Foreign Application Priority Data

Dec. 9, 2019   (KR) .................... 10-2019-0162622

(51) Int. Cl.
*G10L 13/10*      (2013.01)
*G06N 5/04*       (2023.01)
*G10L 13/047*     (2013.01)
*G06N 20/00*      (2019.01)

(52) U.S. Cl.
CPC ........... *G10L 13/10* (2013.01); *G06N 5/04* (2013.01); *G06N 20/00* (2019.01); *G10L 13/047* (2013.01)

(58) Field of Classification Search
CPC ..... G10L 13/10; G10L 13/047; G10L 13/027; G10L 13/033; G10L 13/02; G10L 15/04; G10L 15/063; G10L 19/038; G06N 5/04; G06N 20/00; G06N 3/0445; G06N 3/0454; G06N 3/084
See application file for complete search history.

(56) References Cited

U.S. PATENT DOCUMENTS

| | | | |
|---|---|---|---|
| 6,970,820 B2* | 11/2005 | Junqua | G10L 13/04 704/266 |
| 2012/0166198 A1* | 6/2012 | Lin | G10L 13/10 704/260 |
| 2020/0035215 A1* | 1/2020 | Yang | G10L 25/63 |

OTHER PUBLICATIONS

Chen, Y. Y., Wu, C. H., & Huang, Y. F. (Sep. 2016). Generation of Emotion Control Vector Using MDS-Based Space Transformation for Expressive Speech Synthesis. In INTERSPEECH (pp. 3176-3180) (Year: 2016).*

(Continued)

*Primary Examiner* — Bhavesh M Mehta
*Assistant Examiner* — Nandini Subramani
(74) *Attorney, Agent, or Firm* — Lee Hong Degerman Kang Waimey

(57) ABSTRACT

An artificial intelligence device includes a memory and a processor. The memory is configured to store audio data having a predetermined speech style. The processor is configured to generate a condition vector relating to a condition for determining the speech style of the audio data, reduce a dimension of the condition vector to a predetermined reduction dimension, acquire a sparse code vector based on a dictionary vector acquired through sparse dictionary coding with respect to the condition vector having the predetermined reduction dimension, and change a vector element value included in the sparse code vector.

8 Claims, 12 Drawing Sheets

(56) References Cited

OTHER PUBLICATIONS

M. J. Gangeh, P. Fewzee, A. Ghodsi, M. S. Kamel and F. Karray, "Multiview Supervised Dictionary Learning in Speech Emotion Recognition," in IEEE/ACM Transactions on Audio, Speech, and Language Processing, vol. 22, No. 6, pp. 1056-1068, Jun. 2014 (Year: 2014).*

M. J. Gangeh, P. Fewzee, A. Ghodsi, M. S. Kamel and F. Karray, "Multiview Supervised Dictionary Learning in Speech Emotion Recognition," in IEEE/ACM Transactions on Audio, Speech, and Language Processing, vol. 22, No. 6, pp. 1056-1068, Jun. 2014 i (Year: 2013).*

Tachibana, M., Yamagishi, J., Masuko, T., & Kobayashi, T. (2005), Speech synthesis with various emotional expressions and speaking styles by style interpolation and morphing. IEICE transactions on information and systems, 88(11), 2484-2491 (Year: 2005).*

Makoto Tachibana, Shinsuke Izawa, Takashi Nose and Takao Kobayashi, "Speaker and style adaptation using average voice model for style control in HMM-based speech synthesis," 2008 IEEE International Conference on Acoustics, Speech and Signal Processing, 2008, pp. 4633-4636 (Year: 2008).*

\* cited by examiner

ARTIFICIAL INTELLIGENCE DEVICE AND METHOD FOR GENERATING SPEECH HAVING A DIFFERENT SPEECH STYLE

CROSS-REFERENCE TO RELATED APPLICATIONS

Pursuant to 35 U.S.C. § 119(a), this application claims the benefit of earlier filing date and right of priority to Korean Patent Application No. 10-2019-0162622, filed on Dec. 9, 2019, the contents of which are all hereby incorporated by reference herein in their entirety.

BACKGROUND

The present disclosure relates to an artificial intelligence device and a method for synthesizing speech by controlling a speech style.

The competition for speech recognition technology started from smartphones is expected to ignite in the house in line with the proliferation of the Internet of Things (IoT).

In particular, it is noteworthy that the device is an artificial intelligence (AI) device that can command and communicate via speech.

A speech recognition service utilizes a huge amount of database to select an optimal answer to a user's question.

A speech search function is also a method of converting input speech data into a text in a cloud server to analyze the text and retransmit a real-time search result according to the result.

The cloud server has a computing capability to store the large amount of words and process the large amount of words in real time by identify the large amount of words into speech data according to gender, age, and intonation.

As more speech data is accumulated, the speech recognition will be accurate to the level of human parity.

In addition, there is an increasing demand for a service in which an artificial intelligence device speaks using speech synthesis together with a speech recognition service.

Synthesized speech is an artificial speech produced by synthesizing a speech signal with respect to a given text.

However, since the synthesized speech is an artificial speech, it is difficult to reproduce various speech styles like a human.

Therefore, the necessity of diversifying the speech style of the synthesized speech is increasing.

SUMMARY

The present disclosure aims to solve the above and other problems.

The present disclosure provides an artificial intelligence device and a method for synthesizing speech by controlling a speech style.

The present disclosure provides an artificial intelligence device and a method capable of controlling a speech style in a text to speech (TTS) speech synthesis system.

The present disclosure provides an artificial intelligence device and a method for identifying and changing a vector value necessary for controlling a speech style.

The present disclosure provides an artificial intelligence device and a method for synthesizing speech by changing a speech style when synthesizing speech from text.

According to one aspect of the present disclosure, an artificial intelligence device includes a memory configured to store audio data having a predetermined speech style, and a processor configured to generate a condition vector relating to a condition for determining the speech style of the audio data, reduce a dimension of the condition vector to a predetermined reduction dimension, acquire a sparse code vector based on a dictionary vector acquired through sparse dictionary coding with respect to the condition vector having the predetermined reduction dimension, and change a vector element value included in the sparse code vector.

According to one aspect of the present disclosure, a method for controlling a speech style includes acquiring audio data having a predetermined speech style, generating a condition vector relating to a condition for determining the speech style of the audio data, reducing a dimension of the condition vector to a predetermined reduction dimension, acquiring a sparse code vector based on a dictionary vector acquired through sparse dictionary coding with respect to the condition vector having the predetermined reduction dimension, and changing a vector element value included in the sparse code vector.

The details of one or more embodiments are set forth in the accompanying drawings and the description below. Other features will be apparent from the description and drawings, and from the claims.

DETAILED DESCRIPTION OF THE EMBODIMENTS

Figure 1:
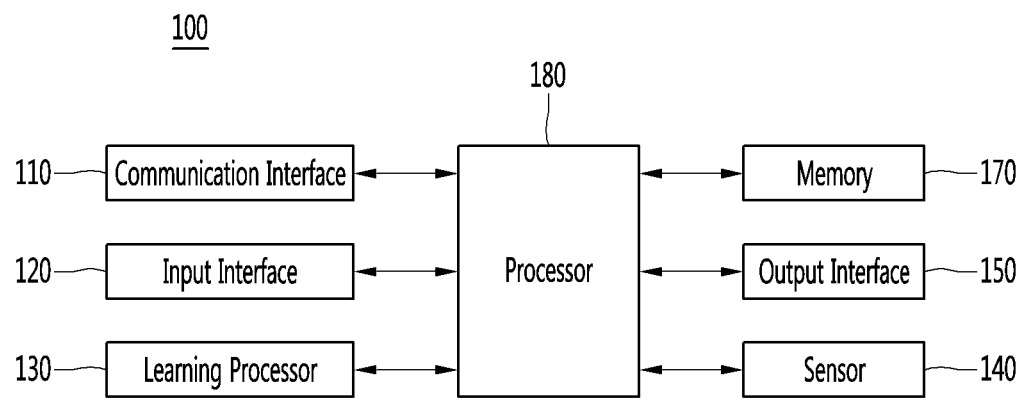
FIG. 1 illustrates an AI device according to an embodiment of the present disclosure.

Hereinafter, embodiments of the present disclosure are described in more detail with reference to accompanying drawings and regardless of the drawings symbols, same or similar components are assigned with the same reference numerals and thus overlapping descriptions for those are omitted. The suffixes "module" and "unit" for components used in the description below are assigned or mixed in consideration of easiness in writing the specification and do not have distinctive meanings or roles by themselves. In the following description, detailed descriptions of well-known functions or constructions will be omitted since they would obscure the invention in unnecessary detail. Additionally, the accompanying drawings are used to help easily understanding embodiments disclosed herein but the technical idea of the present disclosure is not limited thereto. It should be understood that all of variations, equivalents or substitutes contained in the concept and technical scope of the present disclosure are also included.

It will be understood that the terms "first" and "second" are used herein to describe various components but these components should not be limited by these terms. These terms are used only to distinguish one component from other components.

In this disclosure below, when one part (or element, device, etc.) is referred to as being 'connected' to another part (or element, device, etc.), it should be understood that the former can be 'directly connected' to the latter, or 'electrically connected' to the latter via an intervening part (or element, device, etc.). It will be further understood that when one component is referred to as being 'directly connected' or 'directly linked' to another component, it means that no intervening component is present.

<Artificial Intelligence (AI)>

Artificial intelligence refers to the field of studying artificial intelligence or methodology for making artificial intelligence, and machine learning refers to the field of defining various issues dealt with in the field of artificial intelligence and studying methodology for solving the various issues. Machine learning is defined as an algorithm that enhances the performance of a certain task through a steady experience with the certain task.

An artificial neural network (ANN) is a model used in machine learning and may mean a whole model of problem-solving ability which is composed of artificial neurons (nodes) that form a network by synaptic connections. The artificial neural network can be defined by a connection pattern between neurons in different layers, a learning process for updating model parameters, and an activation function for generating an output value.

The artificial neural network may include an input layer, an output layer, and optionally one or more hidden layers. Each layer includes one or more neurons, and the artificial neural network may include a synapse that links neurons to neurons. In the artificial neural network, each neuron may output the function value of the activation function for input signals, weights, and deflections input through the synapse.

Model parameters refer to parameters determined through learning and include a weight value of synaptic connection and deflection of neurons. A hyperparameter means a parameter to be set in the machine learning algorithm before learning, and includes a learning rate, a repetition number, a mini batch size, and an initialization function.

The purpose of the learning of the artificial neural network may be to determine the model parameters that minimize a loss function. The loss function may be used as an index to determine optimal model parameters in the learning process of the artificial neural network.

Machine learning may be classified into supervised learning, unsupervised learning, and reinforcement learning according to a learning method.

The supervised learning may refer to a method of learning an artificial neural network in a state in which a label for learning data is given, and the label may mean the correct answer (or result value) that the artificial neural network must infer when the learning data is input to the artificial neural network. The unsupervised learning may refer to a method of learning an artificial neural network in a state in which a label for learning data is not given. The reinforcement learning may refer to a learning method in which an agent defined in a certain environment learns to select a behavior or a behavior sequence that maximizes cumulative compensation in each state.

Machine learning, which is implemented as a deep neural network (DNN) including a plurality of hidden layers among artificial neural networks, is also referred to as deep learning, and the deep learning is part of machine learning. In the following, machine learning is used to mean deep learning.

<Robot>

A robot may refer to a machine that automatically processes or operates a given task by its own ability. In particular, a robot having a function of recognizing an environment and performing a self-determination operation may be referred to as an intelligent robot.

Robots may be classified into industrial robots, medical robots, home robots, military robots, and the like according to the use purpose or field.

The robot includes a driver including an actuator or a motor and may perform various physical operations such as moving a robot joint. In addition, a movable robot may include a wheel, a brake, a propeller, and the like in a driver, and may travel on the ground through the driver or fly in the air.

<Self-Driving>

Self-driving refers to a technique of driving for oneself, and a self-driving vehicle refers to a vehicle that travels without an operation of a user or with a minimum operation of a user.

For example, the self-driving may include a technology for maintaining a lane while driving, a technology for automatically adjusting a speed, such as adaptive cruise control, a technique for automatically traveling along a predetermined route, and a technology for automatically setting and traveling a route when a destination is set.

The vehicle may include a vehicle having only an internal combustion engine, a hybrid vehicle having an internal combustion engine and an electric motor together, and an electric vehicle having only an electric motor, and may include not only an automobile but also a train, a motorcycle, and the like.

At this time, the self-driving vehicle may be regarded as a robot having a self-driving function.

<eXtended Reality (XR)>

Extended reality is collectively referred to as virtual reality (VR), augmented reality (AR), and mixed reality (MR). The VR technology provides a real-world object and background only as a CG image, the AR technology provides a virtual CG image on a real object image, and the MR technology is a computer graphic technology that mixes and combines virtual objects into the real world.

The MR technology is similar to the AR technology in that the real object and the virtual object are shown together. However, in the AR technology, the virtual object is used in the form that complements the real object, whereas in the MR technology, the virtual object and the real object are used in an equal manner.

The XR technology may be applied to a head-mount display (HMD), a head-up display (HUD), a mobile phone, a tablet PC, a laptop, a desktop, a TV, a digital signage, and the like. A device to which the XR technology is applied may be referred to as an XR device.

FIG. 1 illustrates an AI device 100 according to an embodiment of the present invention.

The AI device (or an AI apparatus) 100 may be implemented by a stationary device or a mobile device, such as a TV, a projector, a mobile phone, a smartphone, a desktop computer, a notebook, a digital broadcasting terminal, a personal digital assistant (PDA), a portable multimedia player (PMP), a navigation device, a tablet PC, a wearable device, a set-top box (STB), a DMB receiver, a radio, a washing machine, a refrigerator, a desktop computer, a digital signage, a robot, a vehicle, and the like.

Referring to FIG. 1, the AI device 100 may include a communication interface 110, an input interface 120, a learning processor 130, a sensor 140, an output interface 150, a memory 170, and a processor 180.

The communication interface 110 may transmit and receive data to and from external devices such as other AI devices 100a to 100e and the AI server 200 by using wire/wireless communication technology. For example, the communication interface 110 may transmit and receive sensor information, a user input, a learning model, and a control signal to and from external devices.

The communication technology used by the communication interface 110 includes GSM (Global System for Mobile communication), CDMA (Code Division Multi Access), LTE (Long Term Evolution), 5G, WLAN (Wireless LAN), Wi-Fi (Wireless-Fidelity), Bluetooth™, RFID (Radio Frequency Identification), Infrared Data Association (IrDA), ZigBee, NFC (Near Field Communication), and the like.

The input interface 120 may acquire various kinds of data.

At this time, the input interface 120 may include a camera for inputting a video signal, a microphone for receiving an audio signal, and a user input interface for receiving information from a user. The camera or the microphone may be treated as a sensor, and the signal acquired from the camera or the microphone may be referred to as sensing data or sensor information.

The input interface 120 may acquire a learning data for model learning and an input data to be used when an output is acquired by using learning model. The input interface 120 may acquire raw input data. In this case, the processor 180 or the learning processor 130 may extract an input feature by preprocessing the input data.

The learning processor 130 may learn a model composed of an artificial neural network by using learning data. The learned artificial neural network may be referred to as a learning model. The learning model may be used to an infer result value for new input data rather than learning data, and the inferred value may be used as a basis for determination to perform a certain operation.

At this time, the learning processor 130 may perform AI processing together with the learning processor 240 of the AI server 200.

At this time, the learning processor 130 may include a memory integrated or implemented in the AI device 100. Alternatively, the learning processor 130 may be implemented by using the memory 170, an external memory directly connected to the AI device 100, or a memory held in an external device.

The sensor 140 may acquire at least one of internal information about the AI device 100, ambient environment information about the AI device 100, and user information by using various sensors.

Examples of the sensors included in the sensor 140 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, and a radar.

The output interface 150 may generate an output related to a visual sense, an auditory sense, or a haptic sense.

At this time, the output interface 150 may include a display for outputting time information, a speaker for outputting auditory information, and a haptic module for outputting haptic information.

The memory 170 may store data that supports various functions of the AI device 100. For example, the memory 170 may store input data acquired by the input interface 120, learning data, a learning model, a learning history, and the like.

The processor 180 may determine at least one executable operation of the AI device 100 based on information determined or generated by using a data analysis algorithm or a machine learning algorithm. The processor 180 may control the components of the AI device 100 to execute the determined operation.

To this end, the processor 180 may request, search, receive, or utilize data of the learning processor 130 or the memory 170. The processor 180 may control the components of the AI device 100 to execute the predicted operation or the operation determined to be desirable among the at least one executable operation.

When the connection of an external device is required to perform the determined operation, the processor 180 may generate a control signal for controlling the external device and may transmit the generated control signal to the external device.

The processor 180 may acquire intention information for the user input and may determine the user's requirements based on the acquired intention information.

The processor 180 may acquire the intention information corresponding to the user input by using at least one of a speech to text (STT) engine for converting speech input into a text string or a natural language processing (NLP) engine for acquiring intention information of a natural language.

At least one of the STT engine or the NLP engine may be configured as an artificial neural network, at least part of which is learned according to the machine learning algorithm. At least one of the STT engine or the NLP engine may be learned by the learning processor 130, may be learned by the learning processor 240 of the AI server 200, or may be learned by their distributed processing.

The processor 180 may collect history information including the operation contents of the AI apparatus 100 or the user's feedback on the operation and may store the collected history information in the memory 170 or the learning processor 130 or transmit the collected history information to the external device such as the AI server 200. The collected history information may be used to update the learning model.

The processor 180 may control at least part of the components of AI device 100 so as to drive an application program stored in memory 170. Furthermore, the processor 180 may operate two or more of the components included in the AI device 100 in combination so as to drive the application program.

Figure 2:
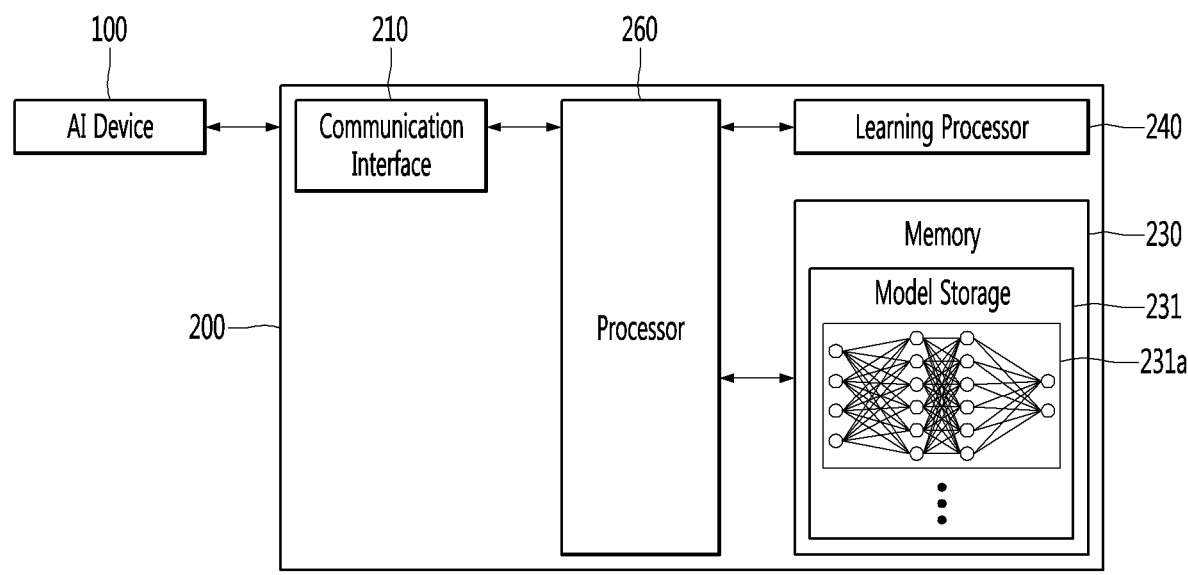
FIG. 2 illustrates an AI server according to an embodiment of the present disclosure.

FIG. 2 illustrates an AI server 200 according to an embodiment of the present invention.

Referring to FIG. 2, the AI server 200 may refer to a device that learns an artificial neural network by using a machine learning algorithm or uses a learned artificial neural network. The AI server 200 may include a plurality of servers to perform distributed processing, or may be defined as a 5G network. At this time, the AI server 200 may be included as a partial configuration of the AI device 100, and may perform at least part of the AI processing together.

The AI server 200 may include a communication interface 210, a memory 230, a learning processor 240, a processor 260, and the like.

The communication interface 210 can transmit and receive data to and from an external device such as the AI device 100.

The memory 230 may include a model storage 231. The model storage 231 may store a learning or learned model (or an artificial neural network 231a) through the learning processor 240.

The learning processor 240 may learn the artificial neural network 231a by using the learning data. The learning model may be used in a state of being mounted on the AI server 200 of the artificial neural network, or may be used in a state of being mounted on an external device such as the AI device 100.

The learning model may be implemented in hardware, software, or a combination of hardware and software. If all or part of the learning models are implemented in software, one or more instructions that constitute the learning model may be stored in memory 230.

The processor 260 may infer the result value for new input data by using the learning model and may generate a response or a control command based on the inferred result value.

Figure 3:
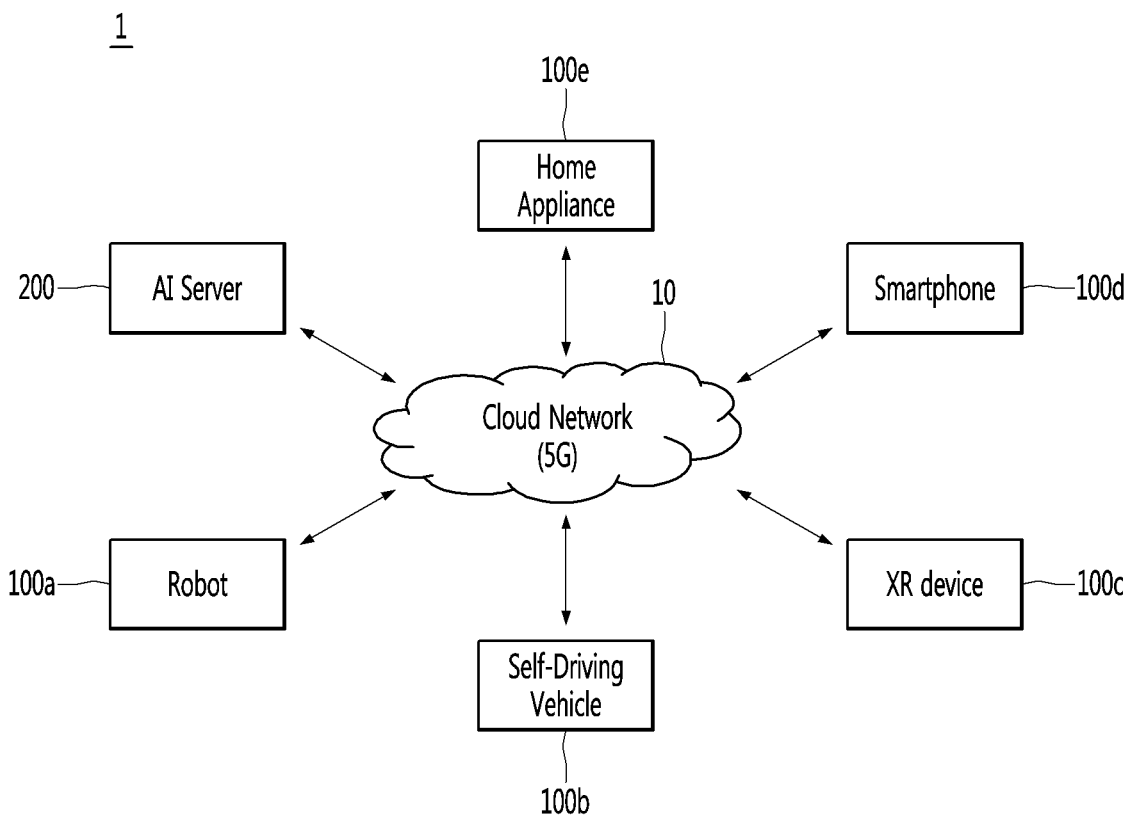
FIG. 3 illustrates an AI system according to an embodiment of the present disclosure.

FIG. 3 illustrates an AI system 1 according to an embodiment of the present invention.

Referring to FIG. 3, in the AI system 1, at least one of an AI server 200, a robot 100a, a self-driving vehicle 100b, an XR device 100c, a smartphone 100d, or a home appliance 100e is connected to a cloud network 10. The robot 100a, the self-driving vehicle 100b, the XR device 100c, the smartphone 100d, or the home appliance 100e, to which the AI technology is applied, may be referred to as AI devices 100a to 100e.

The cloud network 10 may refer to a network that forms part of a cloud computing infrastructure or exists in a cloud computing infrastructure. The cloud network 10 may be configured by using a 3G network, a 4G or LTE network, or a 5G network.

That is, the devices 100a to 100e and 200 configuring the AI system 1 may be connected to each other through the cloud network 10. In particular, each of the devices 100a to 100e and 200 may communicate with each other through a base station, but may directly communicate with each other without using a base station.

The AI server 200 may include a server that performs AI processing and a server that performs operations on big data.

The AI server 200 may be connected to at least one of the AI devices constituting the AI system 1, that is, the robot 100a, the self-driving vehicle 100b, the XR device 100c, the smartphone 100d, or the home appliance 100e through the cloud network 10, and may assist at least part of AI processing of the connected AI devices 100a to 100e.

At this time, the AI server 200 may learn the artificial neural network according to the machine learning algorithm instead of the AI devices 100a to 100e, and may directly store the learning model or transmit the learning model to the AI devices 100a to 100e.

At this time, the AI server 200 may receive input data from the AI devices 100a to 100e, may infer the result value for the received input data by using the learning model, may generate a response or a control command based on the inferred result value, and may transmit the response or the control command to the AI devices 100a to 100e.

Alternatively, the AI devices 100a to 100e may infer the result value for the input data by directly using the learning model, and may generate the response or the control command based on the inference result.

Hereinafter, various embodiments of the AI devices 100a to 100e to which the above-described technology is applied will be described. The AI devices 100a to 100e illustrated in FIG. 3 may be regarded as a specific embodiment of the AI device 100 illustrated in FIG. 1.

<AI+Robot>

The robot 100a, to which the AI technology is applied, may be implemented as a guide robot, a carrying robot, a cleaning robot, a wearable robot, an entertainment robot, a pet robot, an unmanned flying robot, or the like.

The robot 100a may include a robot control module for controlling the operation, and the robot control module may refer to a software module or a chip implementing the software module by hardware.

The robot 100a may acquire state information about the robot 100a by using sensor information acquired from various kinds of sensors, may detect (recognize) surrounding environment and objects, may generate map data, may determine the route and the travel plan, may determine the response to user interaction, or may determine the operation.

The robot 100a may use the sensor information acquired from at least one sensor among the lidar, the radar, and the camera so as to determine the travel route and the travel plan.

The robot 100a may perform the above-described operations by using the learning model composed of at least one artificial neural network. For example, the robot 100a may recognize the surrounding environment and the objects by using the learning model, and may determine the operation by using the recognized surrounding information or object information. The learning model may be learned directly from the robot 100a or may be learned from an external device such as the AI server 200.

At this time, the robot 100a may perform the operation by generating the result by directly using the learning model, but the sensor information may be transmitted to the external device such as the AI server 200 and the generated result may be received to perform the operation.

The robot 100a may use at least one of the map data, the object information detected from the sensor information, or the object information acquired from the external apparatus to determine the travel route and the travel plan, and may control the driver such that the robot 100a travels along the determined travel route and travel plan.

The map data may include object identification information about various objects arranged in the space in which the robot 100a moves. For example, the map data may include object identification information about fixed objects such as walls and doors and movable objects such as pollen and desks. The object identification information may include a name, a type, a distance, and a position.

In addition, the robot 100a may perform the operation or travel by controlling the driver based on the control/interaction of the user. At this time, the robot 100a may acquire the intention information of the interaction due to the user's operation or speech utterance, and may determine the response based on the acquired intention information, and may perform the operation.

<AI+Self-Driving>

The self-driving vehicle 100b, to which the AI technology is applied, may be implemented as a mobile robot, a vehicle, an unmanned flying vehicle, or the like.

The self-driving vehicle 100b may include a self-driving control module for controlling a self-driving function, and the self-driving control module may refer to a software module or a chip implementing the software module by hardware. The self-driving control module may be included in the self-driving vehicle 100b as a component thereof, but may be implemented with separate hardware and connected to the outside of the self-driving vehicle 100b.

The self-driving vehicle 100b may acquire state information about the self-driving vehicle 100b by using sensor information acquired from various kinds of sensors, may detect (recognize) surrounding environment and objects, may generate map data, may determine the route and the travel plan, or may determine the operation.

Like the robot 100a, the self-driving vehicle 100b may use the sensor information acquired from at least one sensor among the lidar, the radar, and the camera so as to determine the travel route and the travel plan.

In particular, the self-driving vehicle 100b may recognize the environment or objects for an area covered by a field of view or an area over a certain distance by receiving the sensor information from external devices, or may receive directly recognized information from the external devices.

The self-driving vehicle 100b may perform the above-described operations by using the learning model composed of at least one artificial neural network. For example, the self-driving vehicle 100b may recognize the surrounding environment and the objects by using the learning model, and may determine the traveling movement line by using the recognized surrounding information or object information. The learning model may be learned directly from the self-driving vehicle 100a or may be learned from an external device such as the AI server 200.

At this time, the self-driving vehicle 100b may perform the operation by generating the result by directly using the learning model, but the sensor information may be transmitted to the external device such as the AI server 200 and the generated result may be received to perform the operation.

The self-driving vehicle 100b may use at least one of the map data, the object information detected from the sensor information, or the object information acquired from the external apparatus to determine the travel route and the travel plan, and may control the driver such that the self-driving vehicle 100b travels along the determined travel route and travel plan.

The map data may include object identification information about various objects arranged in the space (for example, road) in which the self-driving vehicle 100b travels. For example, the map data may include object identification information about fixed objects such as street lamps, rocks, and buildings and movable objects such as vehicles and pedestrians. The object identification information may include a name, a type, a distance, and a position.

In addition, the self-driving vehicle 100b may perform the operation or travel by controlling the driver based on the control/interaction of the user. At this time, the self-driving vehicle 100b may acquire the intention information of the interaction due to the user's operation or speech utterance, and may determine the response based on the acquired intention information, and may perform the operation.

<AI+XR>

The XR device 100c, to which the AI technology is applied, may be implemented by a head-mount display (HMD), a head-up display (HUD) provided in the vehicle, a television, a mobile phone, a smartphone, a computer, a wearable device, a home appliance, a digital signage, a vehicle, a fixed robot, a mobile robot, or the like.

The XR device 100c may analyzes three-dimensional point cloud data or image data acquired from various sensors or the external devices, generate position data and attribute data for the three-dimensional points, acquire information about the surrounding space or the real object, and render to output the XR object to be output. For example, the XR device 100c may output an XR object including the additional information about the recognized object in correspondence to the recognized object.

The XR device 100c may perform the above-described operations by using the learning model composed of at least one artificial neural network. For example, the XR device 100c may recognize the real object from the three-dimensional point cloud data or the image data by using the learning model, and may provide information corresponding to the recognized real object. The learning model may be directly learned from the XR device 100c, or may be learned from the external device such as the AI server 200.

At this time, the XR device 100c may perform the operation by generating the result by directly using the learning model, but the sensor information may be transmitted to the external device such as the AI server 200 and the generated result may be received to perform the operation.

<AI+Robot+Self-Driving>

The robot 100a, to which the AI technology and the self-driving technology are applied, may be implemented as a guide robot, a carrying robot, a cleaning robot, a wearable robot, an entertainment robot, a pet robot, an unmanned flying robot, or the like.

The robot 100a, to which the AI technology and the self-driving technology are applied, may refer to the robot itself having the self-driving function or the robot 100a interacting with the self-driving vehicle 100b.

The robot 100a having the self-driving function may collectively refer to a device that moves for itself along the given movement line without the user's control or moves for itself by determining the movement line by itself.

The robot 100a and the self-driving vehicle 100b having the self-driving function may use a common sensing method so as to determine at least one of the travel route or the travel plan. For example, the robot 100a and the self-driving vehicle 100b having the self-driving function may determine at least one of the travel route or the travel plan by using the information sensed through the lidar, the radar, and the camera.

The robot 100a that interacts with the self-driving vehicle 100b exists separately from the self-driving vehicle 100b and may perform operations interworking with the self-driving function of the self-driving vehicle 100b or interworking with the user who rides on the self-driving vehicle 100b.

At this time, the robot 100a interacting with the self-driving vehicle 100b may control or assist the self-driving function of the self-driving vehicle 100b by acquiring sensor information on behalf of the self-driving vehicle 100b and providing the sensor information to the self-driving vehicle 100b, or by acquiring sensor information, generating environment information or object information, and providing the information to the self-driving vehicle 100b.

Alternatively, the robot 100a interacting with the self-driving vehicle 100b may monitor the user boarding the self-driving vehicle 100b, or may control the function of the self-driving vehicle 100b through the interaction with the user. For example, when it is determined that the driver is in a drowsy state, the robot 100a may activate the self-driving function of the self-driving vehicle 100b or assist the control of the driver of the self-driving vehicle 100b. The function of the self-driving vehicle 100b controlled by the robot 100a may include not only the self-driving function but also the function provided by the navigation system or the audio system provided in the self-driving vehicle 100b.

Alternatively, the robot 100a that interacts with the self-driving vehicle 100b may provide information or assist the function to the self-driving vehicle 100b outside the self-driving vehicle 100b. For example, the robot 100a may provide traffic information including signal information and the like, such as a smart signal, to the self-driving vehicle 100b, and automatically connect an electric charger to a charging port by interacting with the self-driving vehicle 100b like an automatic electric charger of an electric vehicle.

<AI+Robot+XR>

The robot 100a, to which the AI technology and the XR technology are applied, may be implemented as a guide robot, a carrying robot, a cleaning robot, a wearable robot, an entertainment robot, a pet robot, an unmanned flying robot, a drone, or the like.

The robot 100a, to which the XR technology is applied, may refer to a robot that is subjected to control/interaction in an XR image. In this case, the robot 100a may be separated from the XR device 100c and interwork with each other.

When the robot 100a, which is subjected to control/interaction in the XR image, may acquire the sensor information from the sensors including the camera, the robot 100a or the XR device 100c may generate the XR image based on the sensor information, and the XR device 100c may output the generated XR image. The robot 100a may operate based on the control signal input through the XR device 100c or the user's interaction.

For example, the user can confirm the XR image corresponding to the time point of the robot 100a interworking remotely through the external device such as the XR device 100c, adjust the self-driving travel path of the robot 100a through interaction, control the operation or driving, or confirm the information about the surrounding object.

<AI+Self-Driving+XR>

The self-driving vehicle 100b, to which the AI technology and the XR technology are applied, may be implemented as a mobile robot, a vehicle, an unmanned flying vehicle, or the like.

The self-driving driving vehicle 100b, to which the XR technology is applied, may refer to a self-driving vehicle having a means for providing an XR image or a self-driving vehicle that is subjected to control/interaction in an XR image. Particularly, the self-driving vehicle 100b that is subjected to control/interaction in the XR image may be distinguished from the XR device 100c and interwork with each other.

The self-driving vehicle 100b having the means for providing the XR image may acquire the sensor information from the sensors including the camera and output the generated XR image based on the acquired sensor information. For example, the self-driving vehicle 100b may include an HUD to output an XR image, thereby providing a passenger with a real object or an XR object corresponding to an object in the screen.

At this time, when the XR object is output to the HUD, at least part of the XR object may be outputted so as to overlap the actual object to which the passenger's gaze is directed. Meanwhile, when the XR object is output to the display provided in the self-driving vehicle 100b, at least part of the XR object may be output so as to overlap the object in the screen. For example, the self-driving vehicle 100b may output XR objects corresponding to objects such as a lane, another vehicle, a traffic light, a traffic sign, a two-wheeled vehicle, a pedestrian, a building, and the like.

When the self-driving vehicle 100b, which is subjected to control/interaction in the XR image, may acquire the sensor information from the sensors including the camera, the self-driving vehicle 100b or the XR device 100c may generate the XR image based on the sensor information, and the XR device 100c may output the generated XR image. The self-driving vehicle 100b may operate based on the control signal input through the external device such as the XR device 100c or the user's interaction.

Figure 4:
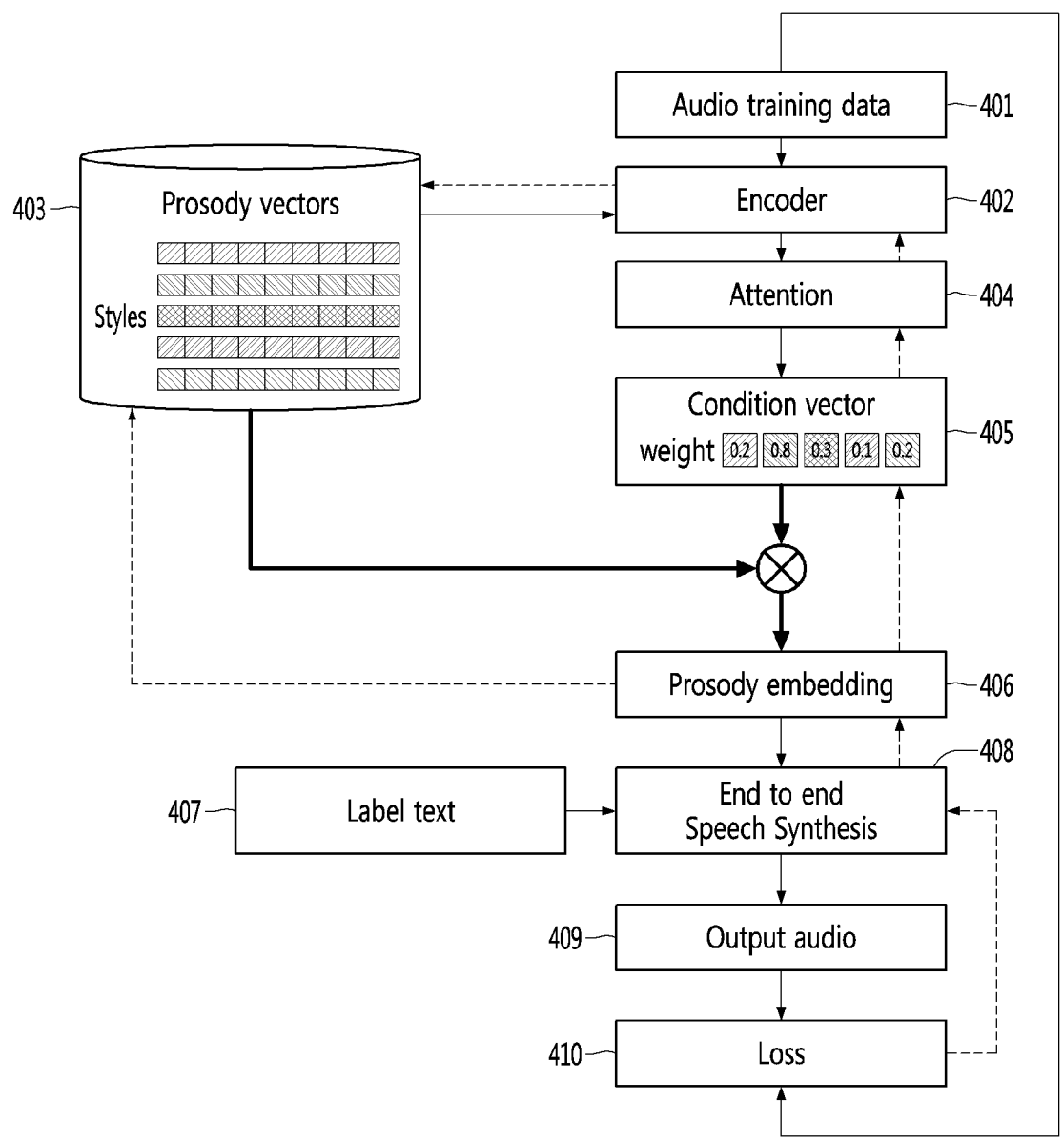
FIG. 4 is a diagram illustrating a speech synthesis system and a learning process thereof, according to an embodiment of the present disclosure.

FIG. 4 is a diagram illustrating a speech synthesis system and a learning process thereof, according to an embodiment of the present disclosure.

The AI device 100 may include a speech synthesis system that synthesizes speech, such as human speech, from text data.

Referring to FIG. 4, the speech synthesis system and the learning process thereof may be learned.

The processor 180 may acquire audio training data 401. The audio training data may be data classified by at least one speech style. For example, the audio training data may include audio data having different speech styles for different emotions, such as anger, happiness, generality, calmness, and sadness.

Also, the audio training data may be labeled with text data 407 that is correct answer data corresponding to the audio data.

The processor 180 may acquire the condition vector 405 by inputting audio training data to an encoder 402.

The encoder 420 may include an Artificial Neural Network (ANN) model used in machine learning. The artificial neural network model may be a model learned by a Convolutional Neural Network (CNN) or a Recurrent Neural Network (RNN) algorithm, but is not limited thereto.

The encoder 402 may output a condition vector 405 relating to a condition for determining the speech style of the input audio training data.

The encoder 402 can also use an attention mechanism 404 for outputting the condition vector 405. For example, the encoder 402 may perform conversion into a vector string representing input audio data, provide the converted vector string as a query of an attention mechanism, project a prosody vector 403 into the query and key of the attention mechanism, and output a condition vector 405 using as weight obtained by the softmax.

The prosody vector 403 may be information representing prosody characteristics for each of various speech styles.

The condition vector 405 may include information about which prosody vector element should be weighted in the prosody vector 403 representing the prosody characteristics for each of the plurality of speech styles.

The processor 180 may acquire a prosody embedding vector 406 representing the speech style of the input audio training data using the condition vector 405 and the prosody vector 403. For example, the processor 180 may acquire the prosody embedding vector 406 by performing the vector inner product of the condition vector 405 and the prosody vector 403.

The processor 180 may input the prosody embedding vector 406 into an end to end speech synthesis model 408 that produces speech, which is the human speech, from the text.

The end to end speech synthesis model 408 may include an artificial neural network (ANN) model used in machine learning. The artificial neural network model may be a model learned by a Convolutional Neural Network (CNN) or a Recurrent Neural Network (RNN) algorithm, but is not limited thereto.

The end to end speech synthesis model 408 may receive the text that is the speech synthesis target, receive the prosody embedding vector 406 representing the speech style, and output the synthesized speech.

The end to end speech synthesis model 408 may acquire correct text data 407 labeled in the input audio training data 401, receive the prosody embedding vector 406, and output the synthesized speech 409 to which the speech style is applied.

The processor 180 may calculate an error 410 by comparing the audio training data 401 with the synthesized speech 409, and learn the speech learning system by applying the corresponding error to backpropagation technique.

Therefore, the processor 180 may output the synthesized speech having the speech style of the input audio data with respect to the predetermined text after completing the learning of the speech learning system.

Figure 5:
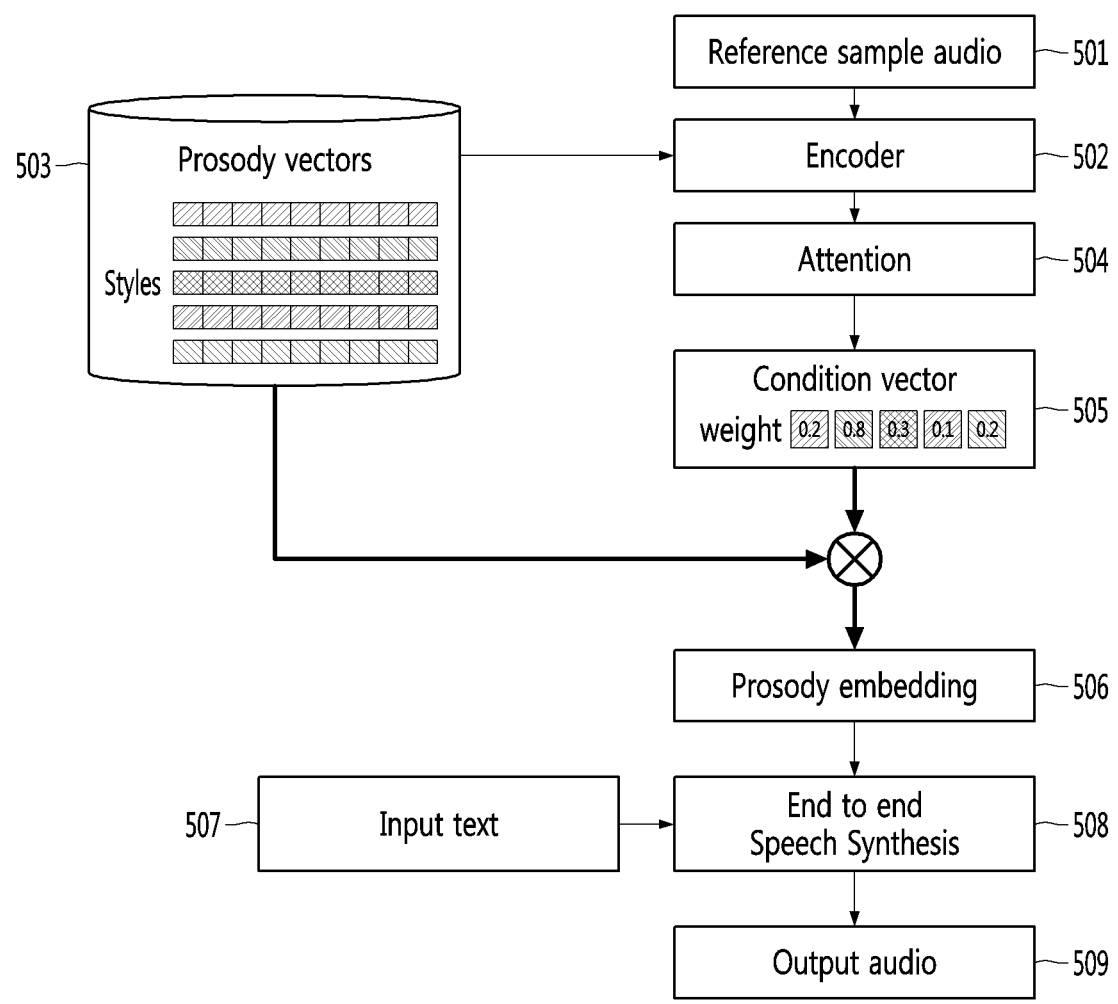
FIG. 5 is a diagram for describing a method for changing a condition vector, according to an embodiment of the present disclosure.

FIG. 5 is a diagram for describing a method for changing a condition vector according to an embodiment of the present disclosure.

The processor 180 may change the acquired condition vector 505 by inputting a reference sample audio 501 having a different speech style to the encoder 502.

That is, when the processor 180 wants to output synthesized speeches having different speech styles with respect to a predetermined text input 507, the processor 180 may input the reference sample audio 501 having different speech styles to acquire different condition vectors 505, and change the prosody embedding vector 506 representing the speech style to output the synthesized speech 509 having different speech style.

However, the method of changing the speech style by selecting the reference sample audio 501 may disadvantages in that fine prosody control is impossible the prosody variation is limited by the reference sample audio.

Figure 6:
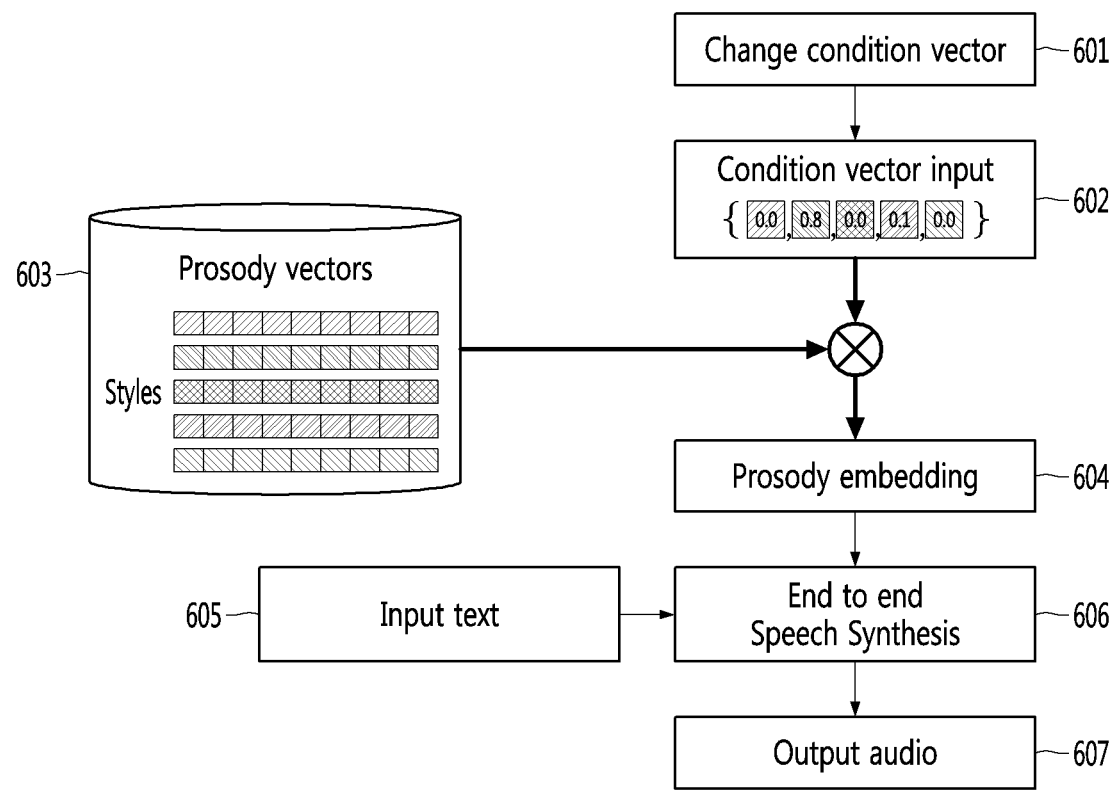
FIG. 6 is a diagram for describing a method for changing a condition vector, according to an embodiment of the present disclosure.

FIG. 6 is a diagram for describing a method for changing a condition vector according to an embodiment of the present disclosure.

The processor 180 may change the condition vector 602 (601) to acquire the prosody embedding vector 604 having the changed speech style. That is, the processor 180 may change the condition vector 602 that is the condition for determining the speech style, and acquire the changed prosody embedding vector 604 using the condition vector 602 and the prosody vector 603. The processor 180 may acquire audio 607 having different speech style from the input text 605 using an end to end speech synthesis model 606.

As such, the method for directly controlling the condition vector may have an advantage in that fine prosody control is possible and the prosody variation is not limited by the reference sample audio.

However, as the dimension of the condition vector becomes more multi-dimensional, there is a problem that it is difficult to determine the influence on the vector element value of another dimension as the vector element value of the condition vector is changed.

For example, when there are more than two types of speech styles differentiated from the prosody vector, the dimension of the condition vector increases. If the condition vector that is the condition for determining the speech style is a five-dimensional vector and one speech style weight is adjusted in ten steps, this becomes $10^5$ of the condition vector. Therefore, it may be impossible to adjust the combination of 100,000 condition vectors.

Therefore, the processor 180 needs to reduce the condition vector element value required to be changed by applying sparse coding that lowers the number of dimensions of the multi-dimensional condition vector and lowers the interdimensional dependency of the condition vector.

Figure 7:
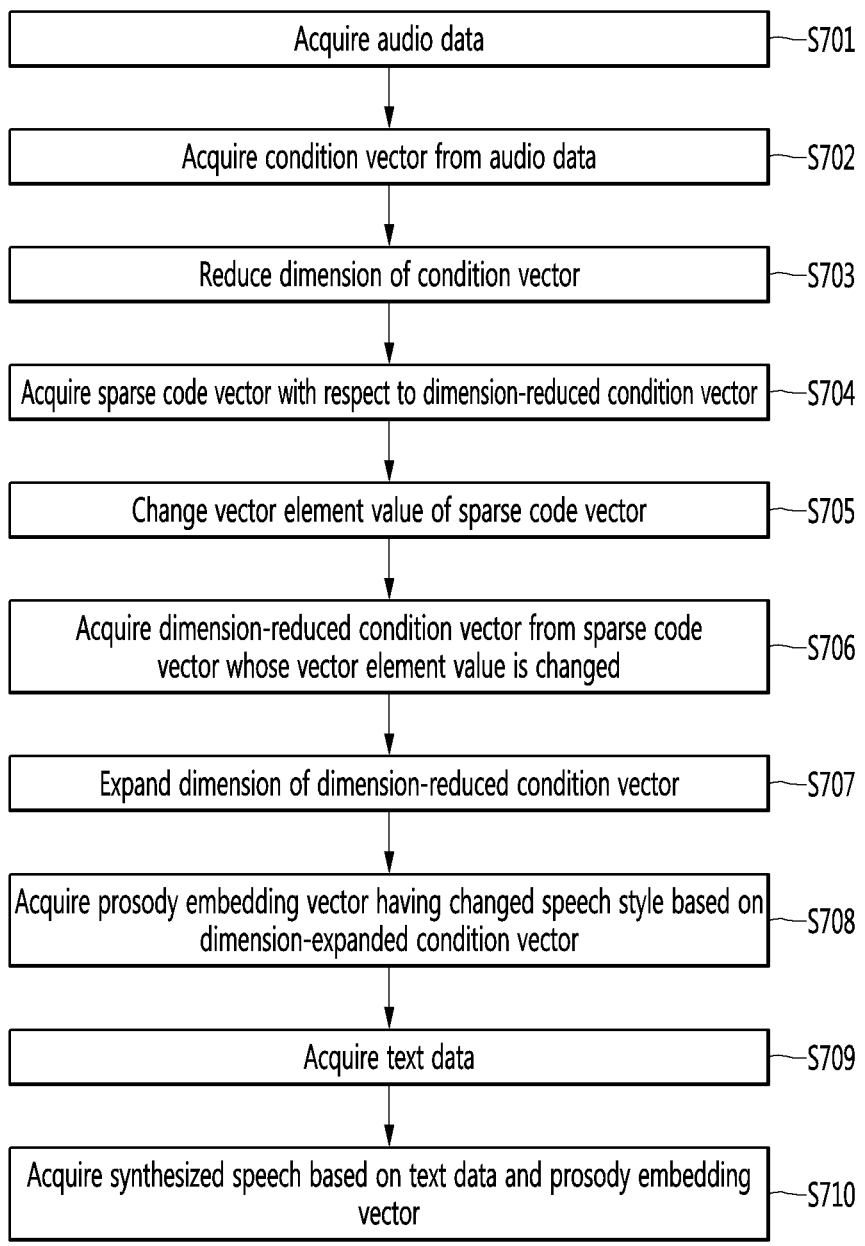
FIG. 7 is a flowchart for describing a speech style control method, according to an embodiment of the present disclosure.

FIG. 7 is a flowchart for describing a speech style control method according to an embodiment of the present disclosure.

The processor 180 may acquire audio data having a predetermined speech style (S701).

The memory 170 may store audio data having a predetermined speech style.

For example, the processor 180 may acquire audio data having different speech styles for different emotions, such as anger, happiness, generality, calmness, and sadness.

When the speech style of the angry emotion is to be applied to the input text, the processor 180 may selectively acquire speech style audio data having the angry emotion.

The processor 180 may acquire a condition vector from the audio data (S702).

The condition vector may be acquired by the encoder and the attention mechanism based on the vector and the prosody vector for the audio data.

The processor 180 may reduce the dimension of the condition vector to a predetermined reduction dimension.

For example, when the condition vector is a 40-dimensional multi-dimensional vector, the condition vector may be reduced to a dimension of 20, which is a preset reduction dimension.

The processor 180 may reduce the condition vector to the predetermined reduction dimension by applying a Principal Component Analysis (PCA) algorithm to the condition vector (S703).

The PCA provides the function of reducing the dimension by discarding the eigen vector of the dimension with minimal variance in the appropriate line when sorted by the order of the eigen values.

The processor 180 may set a reduction dimension with a low loss rate.

Meanwhile, the processor 180 may acquire a sparse code vector based on a dictionary vector acquired through sparse dictionary coding with respect to the condition vector having the predetermined reduction dimension (S704).

For example, the processor 180 may acquire a sparse code vector for determining activity by using a dictionary vector, which is a set of previously acquired distinctive elements, with respect to the condition vector reduced to the dimension of 20.

Figure 8:
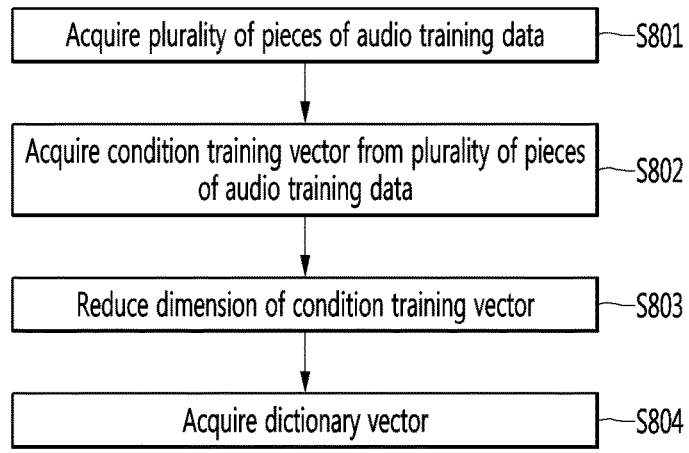
FIG. 8 is a flowchart for describing a method for acquiring a dictionary vector, according to an embodiment of the present disclosure.

FIG. 8 is a flowchart for describing a method for acquiring a dictionary vector according to an embodiment of the present disclosure.

The processor 180 may acquire a plurality of pieces of audio training data for sparse dictionary coding (S801).

The plurality of pieces of audio training data may include audio data pronounced in various speech styles with respect to any text.

The processor 180 may acquire a condition training vector relating to the condition for determining the speech style with respect to each of the plurality of pieces of audio training data (S802).

The condition training vector may be acquired by the encoder and the attention mechanism based on the vector and the prosody vector for each of the audio training data.

The processor 180 may reduce the dimension of each of the acquired condition training vectors to the preset reduction dimension (S803).

The processor 180 may acquire a dictionary vector and a sparse representation coefficient vector, which are capable of acquiring the dimension-reduced condition training vector, through sparse coding (S804).

Figure 9:
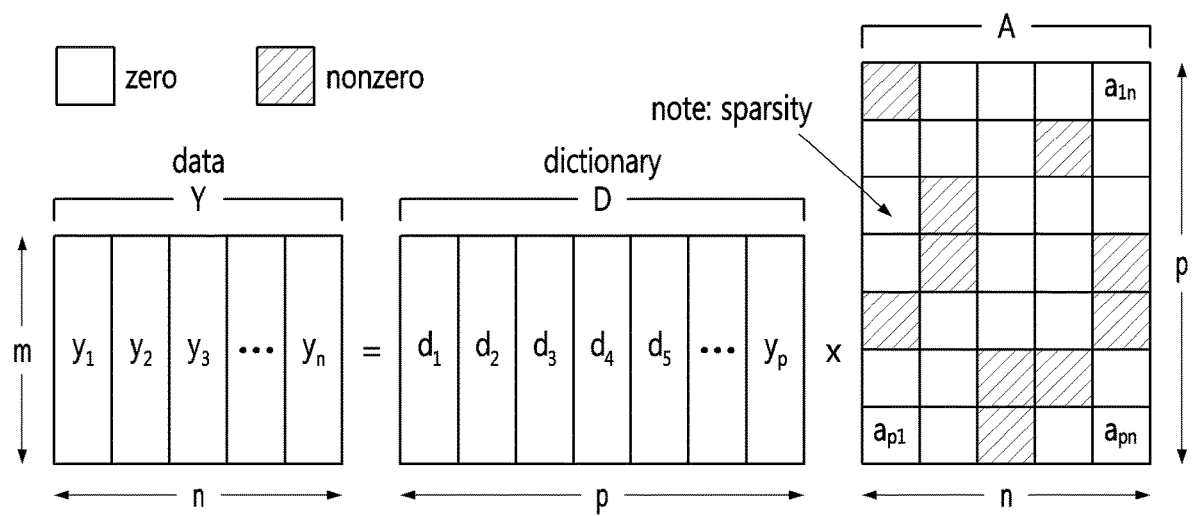
FIG. 9 is a diagram for describing sparse coding according to an embodiment of the present disclosure.

Referring to FIG. 9, data Y represents each of n condition training vectors ($y_1$, $y_2$, $y_3$, ... $Y_n$), whose dimension is reduced. The dictionary vector D represents a vector including element vectors having discriminating powers. A sparse representation coefficient vector A is a vector for acquiring the data Y from a dictionary vector D, most of which is 0 and a significant value has a vector element.

The processor 180 may acquire a dictionary vector D and a sparse representation coefficient vector A through a sparse coding algorithm. The processor 180 may use a Least Absolute Shrinkage and Selection Operator (LASSO) algorithm. The LASSO algorithm may apply L1-norm cost so that the inner product of the dictionary matrix (D) and the sparse representation coefficient vector (A) minimizes the difference from the data (Y), and the sparsity of the sparse representation coefficient vector is maximized by additional limitation.

The processor 180 may store the acquired dictionary vector in the memory 170.

Figure 10:
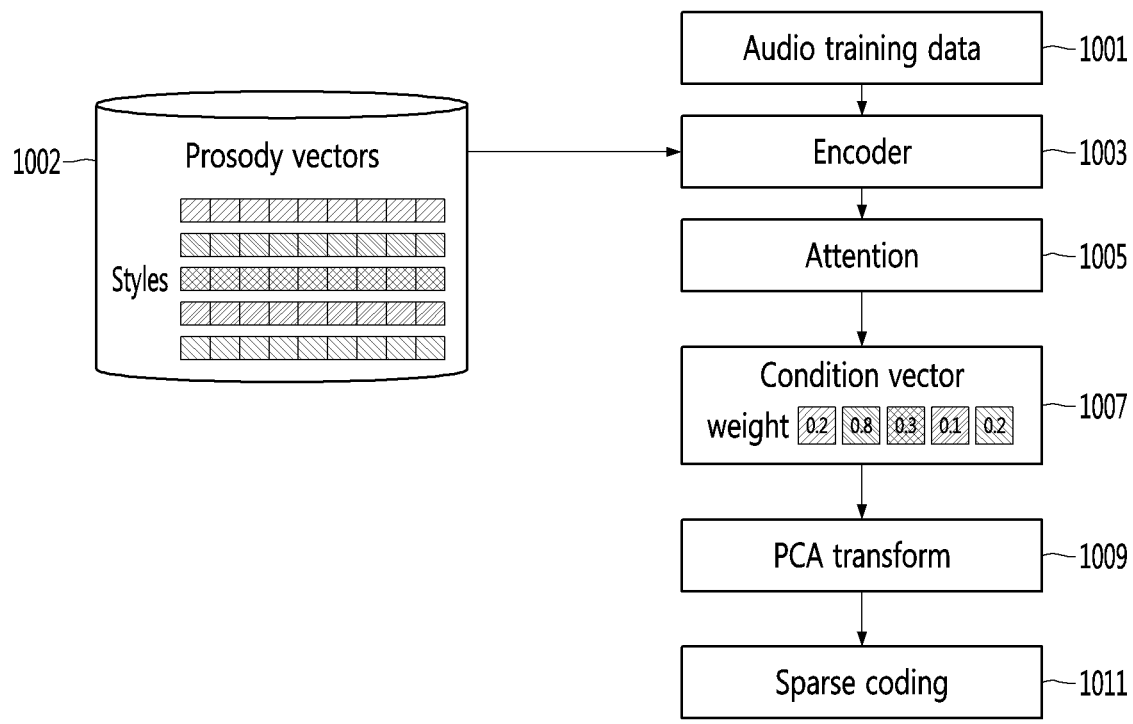
FIG. 10 is a diagram for describing a method for acquiring a dictionary vector, according to an embodiment of the present disclosure.

FIG. 10 is a diagram for describing a method for acquiring a dictionary vector according to an embodiment of the present disclosure.

The processor 180 may acquire a plurality of pieces of audio training data for sparse dictionary coding (1001).

The processor 180 may acquire a condition vector 1005 using an encoder 1003 and an attention mechanism 1004 based on a vector and the rhyme vector 1002 for each of audio training data.

The processor 180 may reduce the dimension of each of the acquired condition training vectors to a predetermined reduction dimension by using a PCA algorithm 1006.

The processor 180 may acquire a dictionary vector and a sparse representation coefficient vector, which are capable of acquiring the dimension-reduced condition training vector, through sparse coding 1007.

Figure 11:
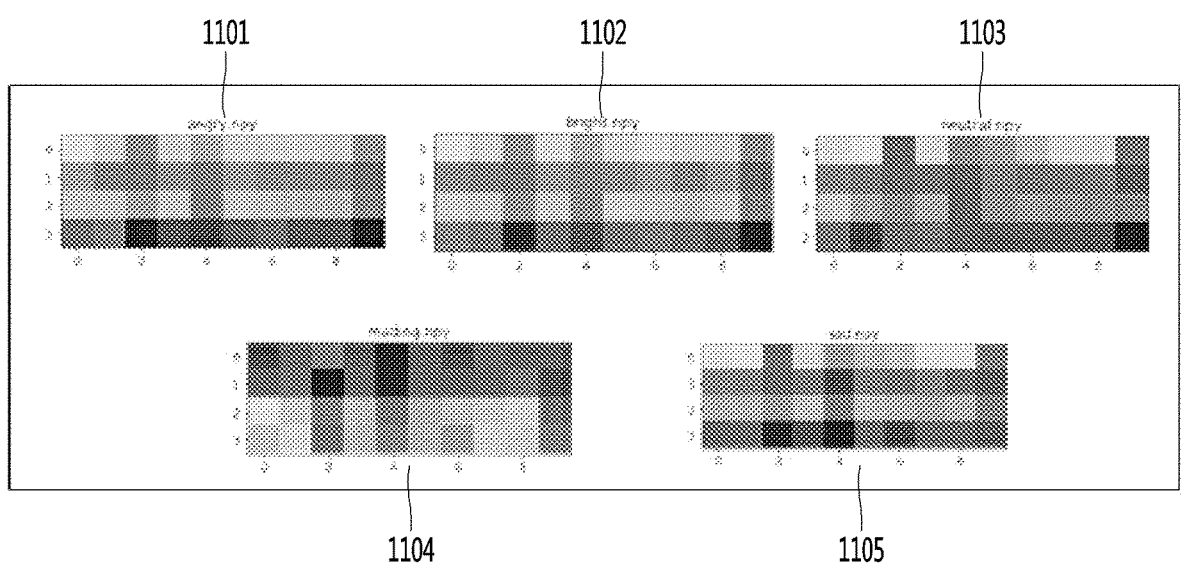
FIG. 11 is a diagram for describing a method for acquiring a sparse code vector, according to an embodiment of the present disclosure.

FIG. 11 is a diagram for describing a method for acquiring a sparse code vector, according to an embodiment of the present disclosure.

Referring to FIG. 11, the processor 180 may acquire a 40-dimensional condition vector 1101 for audio of angry emotion, a 40-dimensional condition vector 1102 for audio of happy emotion, a 40-dimensional condition vector 1103 for audio of general emotion, a 40-dimensional condition vector 1104 for the audio of calm emotion, and a 40-dimensional condition vector 1105 for the audio of sad emotion.

The processor 180 may reduce the condition vectors 1101, 1102, 1103, 1104, and 1105 to dimension of 20, and acquire sparse code vectors 1106, 1107, 1108, 1109, and 1110 based on the dictionary vectors for the condition vectors reduced to the dimension of 20. In addition, the processor 180 may acquire sparse code vectors 1111, 1112, 1113, 1114, and 1115 that are expressed as graphics.

Referring to the sparse code vector 1106 of the angry emotion, it can be seen that the vector element value of other dimension is 0, and the valid vector element values (1.66, 0.76) are vector element values that influence the condition that determine the speech style of the angry emotion.

The processor 180 may change the vector element value of the sparse code vector (S705).

The processor 180 may change the vector element value for the valid vector element included in the sparse code vector.

Figure 12:
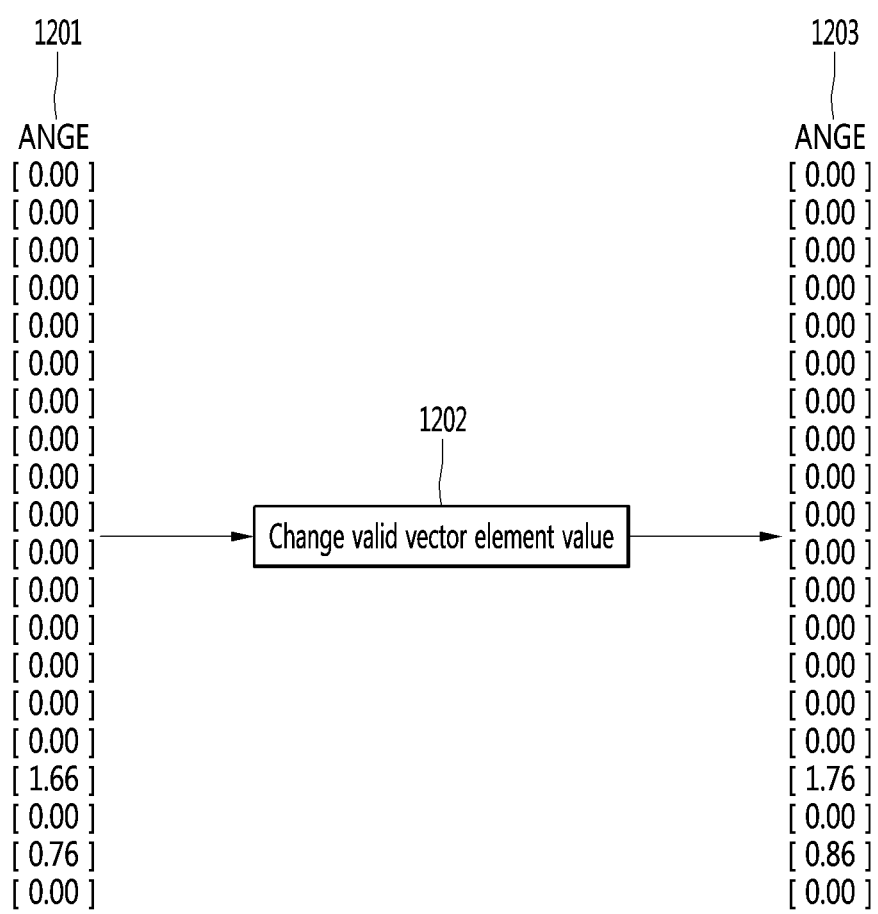
FIG. 12 is a diagram for describing a method for changing a vector element value, according to an embodiment of the present disclosure.

Referring to FIG. 12, the processor 180 may acquire the changed sparse code vector 1203 having the valid vector element values (1.76, 0.86) by changing the valid vector element values (1.66, 0.76) of the sparse code vector 1201 of the angry emotion (1202).

Therefore, the processor 180 may control the speech style of the angry emotion to acquire the speech style of the angry emotion in which the prosody characteristic is changed.

When the sparse code vector is plural, the processor may change the vector element value based on the valid vector element included in each of the plurality of sparse code vectors.

Figure 13:
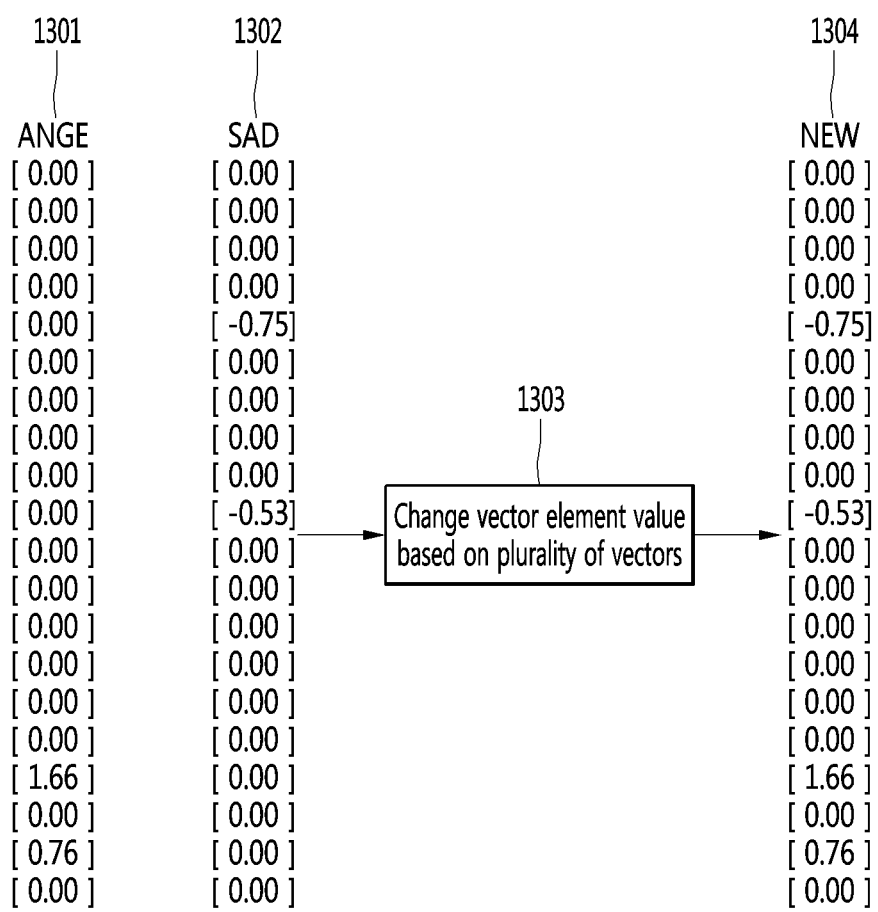
FIG. 13 is a diagram for describing a method for changing a vector element value, according to an embodiment of the present disclosure.

Referring to FIG. 13, the processor 180 may change the vector element value by adding the sparse code vector 1301 of the angry emotion and the sparse code vector 1302 of the sad emotion (1303). The processor 180 may acquire a sparse code vector 1304 in which the angry emotion and the sad emotion are mixed. Therefore, the processor 180 may generate a new speech style by controlling the speech style.

Meanwhile, the processor 180 may acquire a dimension-reduced condition vector from the sparse code vector whose vector element value is changed (S706).

The processor 180 may acquire the condition vector having the predetermined reduction dimension from the sparse code vector having the changed vector element value based on the dictionary vector. For example, the processor 180 may acquire a 20-dimensional condition vector from the sparse code vector whose vector element value is changed.

Also, the processor 180 may acquire the condition vector in which the condition for determining the speech style is changed by extending the dimension of the condition vector having the predetermined dimension (S707).

The processor 180 may acquire the condition vector having the original dimension by expanding the dimension using an inverse transform of the PCA algorithm. For example, the processor 180 may acquire the 40-dimensional condition vector using the inverse transform of the PCA algorithm with respect to the 20-dimensional condition vector.

Thus, the processor 180 may acquire, from the changed sparse code vector, the condition vector in which the condition for determining the speech style having the original dimension is changed.

Also, the processor 180 may acquire the prosody embedding vector having the changed speech style based on the condition vector whose dimension is determined (S708).

The processor 180 may acquire the prosody vector representing each of at least one speech style, and generate the prosody embedding vector having the changed speech style by using the prosody vector and the condition vector in which the condition for determining the speech style is changed.

Meanwhile, the processor 180 may acquire text data that is the speech synthesis target (S709).

The processor 180 may generate the synthesized speech based on the acquired text data and the prosody embedding vector whose speech style is changed (S710).

Therefore, the processor 180 may generate a synthesized speech having a different speech style by changing the sparse code vector.

Figure 14:
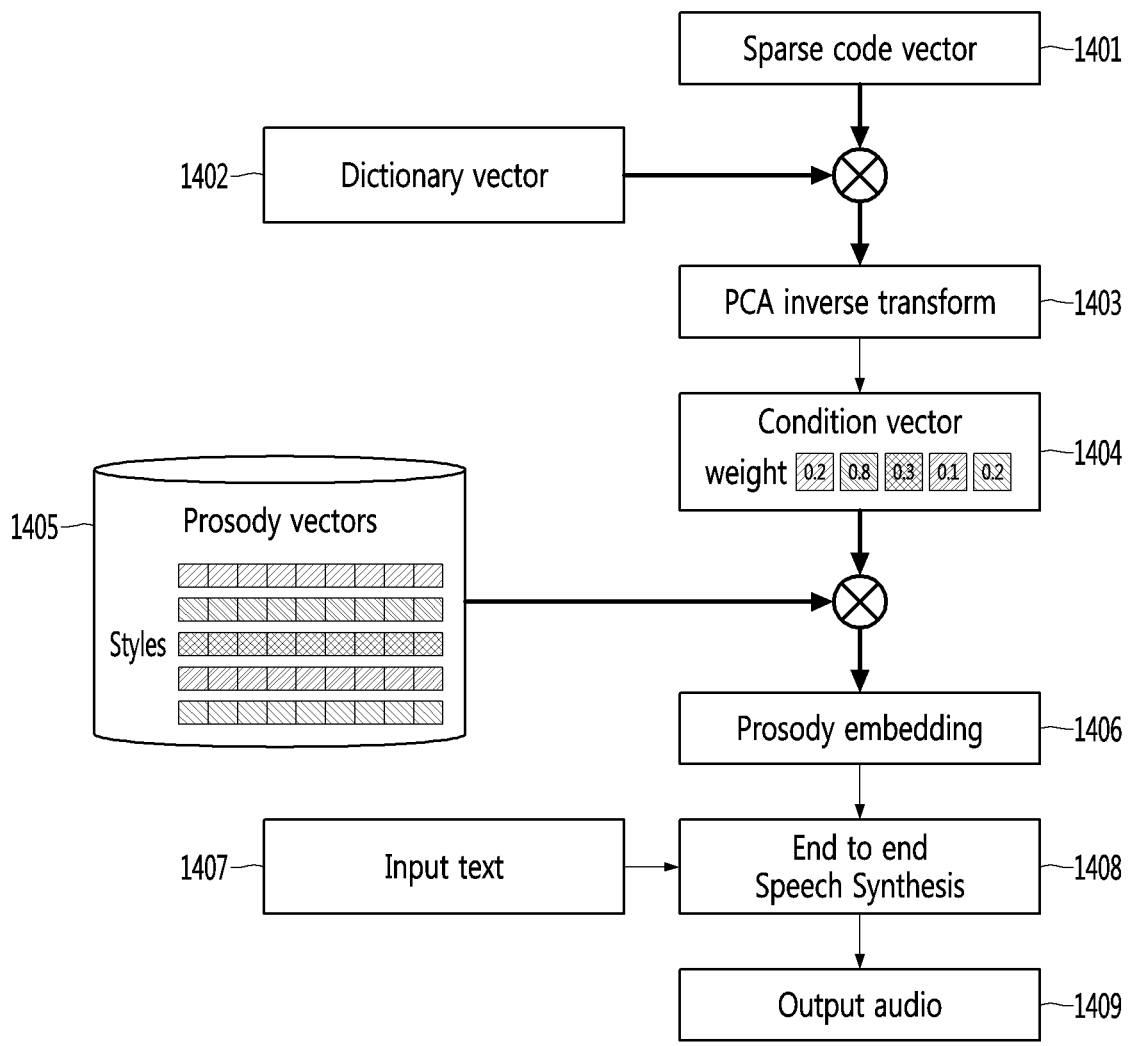
FIG. 14 is a flowchart for describing a speech synthesis method according to an embodiment of the present disclosure.

FIG. 14 is a flowchart for describing a speech synthesis method according to an embodiment of the present disclosure.

The processor 180 may acquire a sparse code vector having a changed vector element value (1401).

The processor 180 may acquire a condition vector having a predetermined reduction dimension from the sparse code vector having the changed vector element value based on a dictionary vector.

Also, the processor 180 may acquire a condition vector 1404 in which a condition for determining a speech style is changed by extending the dimension of the condition vector having the predetermined dimension.

The processor 180 may generate a prosody embedding vector 1406 having a changed speech style by using the prosody vector 1405 and the condition vector 1404 having the condition for determining the speech style.

The processor 180 may generate the synthesized speech 1409 by using the end to end speech synthesis model 1408 based on the text data 1407 and the prosody embedding vector 1406 having the changed speech style.

Therefore, the processor 180 may efficiently manage the fine prosody change by efficiently tuning and controlling the multi-dimensional condition vector. Furthermore, when the speech style needs to be changed according to the situation, the processor 180 may control the speech style to synthesize the speech to which the speech style suitable for the situation is applied.

According to the embodiment of the present disclosure, speech may be synthesized by controlling the speech style.

Also, according to various embodiments of the present disclosure, it is possible to determine the vector value to be changed in the multi-dimensional condition vector that determines the speech style.

According to various embodiments of the present disclosure, the condition vector for determining a new speech style may be generated based on the condition vectors for determining different speech styles.

According to various embodiments of the present disclosure, when synthesizing speech from text, the speech may be synthesized by changing the speech style.

The present disclosure may be embodied as computer-readable codes on a program-recorded medium. The computer-readable recording medium may be any recording medium that can store data which can be thereafter read by a computer system. Examples of the computer-readable medium may include a hard disk drive (HDD), a solid state disk (SSD), a silicon disk drive (SDD), a ROM, a RAM, a CD-ROM, a magnetic tape, a floppy disk, and an optical data storage device. The computer may also include the processor 180 of the artificial intelligence apparatus.

What is claimed is:

1. A method for generating a synthesized speech having a different speech style, the method comprising:
acquiring audio data having different speech styles for different emotions;
generating a condition vector relating to a condition for determining the speech style of the audio data;
reducing a dimension of the condition vector to a predetermined reduction dimension;
acquiring a sparse code vector based on a dictionary vector acquired through sparse dictionary coding with respect to the condition vector having the predetermined reduction dimension;
changing a vector element value included in the sparse code vector;
acquiring the condition vector having the predetermined reduction dimension from the sparse code vector having the changed vector element value based on the dictionary vector;
acquiring the condition vector in which the condition for determining the speech style is changed by extending the dimension of the condition vector having the predetermined dimension;
acquiring a prosody vector representing each of at least one speech style;
generating a prosody embedding vector having a changed speech style using the prosody vector and the condition vector having the changed condition for determining the speech style;
acquiring text data; and
generating a synthesized speech based on the text data and the prosody embedding vector,
wherein the reduced dimension of the condition vector is determined by discarding an eigen vector of the dimension with variance smaller than a reference variance based on the order of the eigen values;
wherein the acquired sparse code vector is determined by using the dictionary vector with significant distinctive elements and the sparse code vector includes a plurality of vector element values having at least one valid vector element value and the remainder,
wherein the speech style is changed based on the sparse code vector mixed a first valid vector element value determining first emotion and a second valid vector element value determining a second emotion different from the first emotion, and the second valid vector element value is different from the first valid vector element value,
wherein the predetermined reduced dimension of the condition vector having a first dimension is acquired from the sparse code vector having the changed vector element value, and
wherein the extended dimension of the condition vector having a second dimension which is twice the first dimension of the condition vector is determined by Inverse Principal Component Analysis (IPCA).

2. The method according to claim 1, further comprising:
acquiring a plurality of pieces of audio training data for the sparse dictionary coding; and
acquiring condition training vectors relating to the condition for determining the speech style with respect to the plurality of pieces of audio training data.

3. The method according to claim 1, wherein the predetermined reduced dimension of the condition vector corresponds to a pre-set low loss rate.

4. The method according to claim 1, wherein the IPCA comprises a PCA algorithm that reduces the condition vector to the predetermined reduction dimension by discarding a dimension of an eigen vector of the condition vector having a minimal variance based on an order-based sorting of the eigen values of the condition vector.

5. An artificial intelligence device configured to generate a synthesized speech having a different speech style and comprising:
a memory configured to store audio data having different speech styles for different emotions; and
a processor configured to:
generate a condition vector relating to a condition for determining the speech style of the audio data;

reduce a dimension of the condition vector to a predetermined reduction dimension;

acquire a sparse code vector based on a dictionary vector acquired through sparse dictionary coding with respect to the condition vector having the predetermined reduction dimension;

change a vector element value included in the sparse code vector;

acquire the condition vector having the predetermined reduction dimension from the sparse code vector having the changed vector element value based on the dictionary vector;

acquire the condition vector in which the condition for determining the speech style is changed by extending the dimension of the condition vector having the predetermined dimension;

acquire a prosody vector representing each of at least one speech style;

generate a prosody embedding vector having a changed speech style using the prosody vector and the condition vector having the changed condition for determining the speech style;

acquire text data; and generate a synthesized speech based on the text data and the prosody embedding vector, wherein the reduced dimension of the condition vector is determined by discarding an eigen vector of the dimension with variance smaller than a reference variance based on the order of the eigen values;

wherein the acquired sparse code vector is determined by using the dictionary vector with significant distinctive elements and the sparse code vector includes a plurality of vector element values having at least one valid vector element value and the remainder 0;

wherein the speech style is changed based on the sparse code vector mixed a first valid vector element value determining first emotion and a second valid vector element value determining a second emotion different from the first emotion, and the second valid vector element value is different from the first valid vector element value, wherein the predetermined reduced dimension of the condition vector having a first dimension is acquired from the sparse code vector having the changed vector element value, wherein the extended dimension of the condition vector having a second dimension which is twice the first dimension of the condition vector is determined by Inverse Principal Component Analysis (IPCA).

6. The artificial intelligence device according to claim 5, wherein the processor is configured to:

acquire a plurality of pieces of audio training data for the sparse dictionary coding; and acquire condition training vectors for determining the speech style with respect to the plurality of pieces of audio training data.

7. The artificial intelligence device according to claim 5, wherein the predetermined reduced dimension of the condition vector corresponds to a pre-set low loss rate.

8. The artificial intelligence device according to claim 5, wherein the IPCA comprises a PCA algorithm that reduces the condition vector to the predetermined reduction dimension by discarding a dimension of an eigen vector of the condition vector having a minimal variance based on an order-based sorting of the eigen values of the condition vector.

* * * * *